United States Patent
Lopez

[15] 3,706,684
[45] Dec. 19, 1972

[54] TRAFFIC PAINT COMPOSITIONS

[72] Inventor: John A. Lopez, Marlton, N.J.

[73] Assignee: Shell Oil Company, New York, N.Y.

[22] Filed: June 11, 1971

[21] Appl. No.: 152,390

Related U.S. Application Data

[63] Continuation-in-part of Ser. No. 756,327, Aug. 29, 1968, abandoned.

[52] U.S. Cl. ............260/18 EP, 94/22, 260/37 EP, 260/830 TW
[51] Int. Cl. .............................................C08g 30/12
[58] Field of Search..................................260/18 EP

[56] References Cited

UNITED STATES PATENTS 3,446,762   5/1969   Lopez et al. ......................260/18 EP Primary Examiner—Donald E. Czaja
Assistant Examiner—C. Warren Ivy
Attorney—Martin S. Baer et al.

[57] ABSTRACT

Rapid-dry, one-package, epoxy traffic paint compositions which require no curing agent and which exhibits reduced dirt pick-up comprise (1) an organic solvent, (2) a pigment and (3) a condensation product comprising near equal molar ratios of a polyepoxide and a dimer acid wherein the polyepoxide is a blend of two separately prepared glycidyl polyethers of a polyhydric phenol, one a liquid, the other a solid.

4 Claims, No Drawings

TRAFFIC PAINT COMPOSITIONS

This is a continuation-in-part of Ser. No. 756,327, filed Aug. 29, 1968, now abandoned.

BACKGROUND OF THE INVENTION

There is a growing need for highway or traffic paints which will dry rapidly, not age-harden, crack, and peel off. Traffic paints which have good adhesion, i.e., will not be picked up by traffic, and which have good durability are also needed. Conventional traffic paints now in use are based on drying oil alkyds. The drying oil alkyd resins used in alkyd resin based paints are an oxidizing alkyd comprising, for example, phthalic anhydride and glycerin modified with a drying oil. The drying oil alkyd based paints to which a solvent, such as naphtha or white spirits, has been added are applied to highway surfaces as a liquid. The solvent is released by evaporation and subsequently the unsaturated fatty acid chains of the resin molecule readily absorbs oxygen from the air and dry the resin to form a tough film. Thus, the drying rate in the drying oil alkyd resins is a function of oxidative polymerization, as well as solvent release. The oxidation, however, continues and the film becomes progressively harder resulting in embrittlement and reduction of abrasive resistance thereof causing the film to crack and peel off.

Epoxy-containing materials, such as those described in U.S. Pat. No. 2,970,983 have been incorporated into coating compositions, however, these epoxy materials all require epoxy curing agents in order to provide a useful coating.

Epoxy film-forming condensates which dry rapidly and have good adhesion, do not require curing agents, do not age-harden, which retain their toughness and abrasive resistance, and which have outstanding durability, i.e., weathering and wearing resistance are disclosed and claimed in U.S. Pat. No. 3,446,762. While these epoxy compositions are very suitable for use in traffic paint formulations they do not have the extreme rapidity of cure demanded for some applications. Also, it has been found that when applied during unusually hot weather, these epoxy condensates tend to collect an objectionable amount of dirt from the passing traffic.

It has now been found that when a special blend of separately prepared glycidyl polyethers of polyhydric phenols is used to prepare the epoxy-dimer acid condensates, the resulting epoxy condensates exhibit improved properties, i.e., faster drying times, over conventional traffic paints based on drying oil alkyds and significantly reduce the dirt pick-up exhibited by more conventional epoxy resin traffic paints. These results are quite surprising in view of the fact that glycidyl polyethers of polyhydric phenols as prepared in the usual one-step process of reacting epichlorohydrin with bisphenol A in the presence of caustic results in a mixture of various molecular weight epoxies. The reason for this improvement is not presently understood, but the improvements are realized by using a blend of two specific, separately prepared glycidyl polyethers of polyhydric phenols in the preparation of the epoxy-dimer condensate.

SUMMARY OF THE INVENTION

Traffic paint compositions which exhibit improved drying properties and significantly reduce dirt pick-up comprise the following components:

1. A condensation product comprising near equal molar ratios of a special blend of two separately prepared glycidyl polyethers of a polyhydric phenol, one a liquid the other a solid, and a dimer acid;
2. solvent, and
3. pigment.

The paint compositions of the present invention which are one-package systems, i.e., the compositions are applied without the addition thereto of further materials, such as curing agents, are particularly suitable for traffic paint applications. Heretofore, it was believed necessary in formulating traffic paint compositions to employ resins modified with drying oils in order to obtain a hard dry coating which would not be picked up by traffic and stick to tires. The paint compositions of the present invention, however, do not employ drying oils. The paint compositions of the present invention are applied to the highway surface, and the solvent then evaporates leaving a tough film on the highway surface which is not picked up by traffic. These paint compositions contain little unsaturation and essentially dry by solvent evaporation. Accordingly, the initial molecular structure of the resin compositions of the present invention remain substantially unchanged after all the solvent is released, whereas drying oil alkyd compositions continue to age-harden according to the customary mechanism of oxidative polymerization and become brittle.

DESCRIPTION OF THE PREFERRED EMBODIMENT

The essential feature of the present invention is the particular blend of two separately prepared glycidyl polyethers of 2,2-bis(4-hydroxphenyl)propane, one a liquid the other a solid, used to prepare the condensate binder for the present traffic paint formulations.

THE CONDENSATION PRODUCT COMPONENT

The condensation product component of the compositions of the present invention are polymers obtained by reacting in nearly equal molar proportions (chemical equivalents) a dimer acid with a special blend of separately prepared glycidyl polyethers of 2,2-bis(4-hydroxphenyl)propane.

In general, excellent traffic paints are obtained when the glycidyl polyethers which are reacted with the dimer acids to form the binder condensate consist essentially of the blend of the two following separately prepared glycidyl polyethers:

1. from about 0.85 to about 0.99, and preferably from about 0.90 to 0.99 chemical equivalents of a liquid glycidyl polyether of 2,2-bis(4-hydroxyphenyl)propane having an average molecular weight of from about 350 to 500, preferably about 350, and an epoxide equivalent weight of about 175 to 250, preferably about 185–195, and 2. from about 0.01 to about 0.15, and preferably from about 0.01 to 0.10 chemical equivalents of a solid glycidyl polyether of 2,2-bis(4-hydroxyphenyl)propane having an average molecular weight of from about 800 to 1,500, preferably about 900, and an epoxide equivalent weight of from about 400 to 1,200, preferably about 425 to 550.

The above described glydicyl polyethers of 2,2-bis(4-hydroxyphenyl)propane have the following general structural formula:

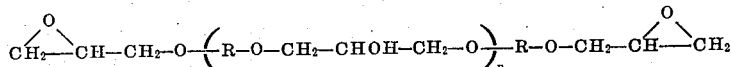

wherein n is an integer of the series 0, 1, 2, 3, and R represents the divalent radical

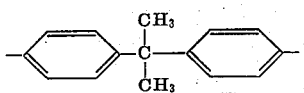

While for any single molecule, n will be an integer, the fact that the polyether is a mixture of compounds causes the determined value of n, e.g., from molecular weight measurements, to be an average which is not necessarily zero or a whole number. It will be appreciated that the value of n will be selected so that the final average molecular weight of the glycidyl polyether has the desired value.

Simply, the polyethers which are suitable for use in preparing the present condensates are prepared by heating 2,2-bis(4-hydroxyphenyl)propane (bis-phenol) with epichlorohydrin in a basic reaction medium. Depending upon the type (molecular weight range, etc.) of product desired, there is used from more than 1 to 2 or more moles of epichlorohydrin per mole of bisphenol. Also present is a base, such as sodium hydroxide, generally in an amount of from about 5 to 30 percent stoichiometric excess of the epichlorohydrin, i.e., 1.05 to 1.3 equivalents of base per mold of epichlorohydrin. In effecting the reaction, the bisphenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heating is applied for several hours while stirring in order to complete the reaction. While still in the molten state, the formed polyether is washed with water until free of base, and then heated to remove the water.

The preparation of two glycidyl polyethers of 2,2-bis(4-hydroxyphenyl)propane which comprise a very preferred blend are illustrated below:

Polyether A — About 2 mols of bis-phenol was dissolved in 10 mols of epichlorohydrin and 1 to 2 percent water added to the remaining mixture. The mixture was then brought to 80° C and 4 mols of solid sodium hydroxide added in small portions over a period of about 1 hour. During the addition, the temperature of the mixture was held to about 90° C to 110° C. After the sodium hydroxide had been added, the water formed in the reaction and most of the epichlorohydrin was distilled off. The residue that remained was combined with an approximately equal amount of benzene and the mixture filtered to remove the salt. The benzene was then removed to yield a viscous liquid having a viscosity of about 150 poises at 25° C and a molecular weight of about 350 (measured ebullioscopically in ethylene dichloride). The product had an epoxy value of 0.50 eq./100 g., and an epoxy equivalent weight of about 185–195. For convenience, this product will be referred to hereinafter as Polyether A.

Polyether B — Into a reaction vessel fitted with a stirrer, 1 mol 10 of 2,2-bis(4-hydroxyphenyl)propane, referred to as (bis-phenol), and 1.88 mols of sodium hydroxide as a 10% aqueous solution are introduced and heated to about 45° C whereupon 1.57 mols of epichlorohydrin are added rapidly while agitating the mixture. The temperature is then adjusted so that the mixture is heated at about 100° C to 105° C for about 80 minutes. The mixture separates into a two-phase system and the aqueous layer is decanted. The product is then washed with hot water until neutral to litmus whereupon the resulting polyether is drained and dehydrated by heating at about 150°C.

The polyether has a softening point of about 71°C (Durrans' Mercury Method). The molecular weight is 900 measured ebullioscopically in ethylene dichloride (average n = 2), and the epoxide equivalent weight is from about 425 to 550, which is the grams of resin containing one gram-equivalent of epoxide.

A very suitable binder condensate is prepared by reacting (1) from 0.70 to 1.25 chemical equivalents of a dimer acid and (2) a blend comprising from about 0.85 to 0.99 chemical equivalents of Polyether A and from about 0.01 to 0.15 chemical equivalents of Polyether B.

It will be appreciated that the ratio on a chemical equivalent basis of the lower molecular weight glycidyl polyether (e.g., Polyether A) to higher molecular weight glycidyl polyether (e.g., Polyether B) may vary widely. In fact, even when the blend contains substantially all Polyether A or substantially all Polyether B, traffic paint systems are obtained which are at least two-fold better in performance than conventional alkyd-based systems. However, performance data indicates that the most outstanding overall performance properties are obtained when the blend comprises about 0.90 chemical equivalents of Polyether B. Excellent traffic paints are also obtained when other high molecular weight glycidyl polyethers are used in lieu of Polyether B.

The dimer acids which are suitable for preparing the condensation product comprise the acids obtained by polymerizing unsaturated fatty acids, such as soyabean oil fatty acids and the like. Particularly preferred are the dimerized acids obtained from the ethylenically unsaturated fatty acids or mixtures thereof derived from semi-drying and drying oils, and particularly the conjugated fatty acids containing at least 12 and generally from about 12 to about 20 carbon atoms, such as 9,11-octadecadienoic acid and other acids within the generic formula R — CH = CH — CH = CH — R$^1$ wherein R is a — R$^2$COOH radical, R$^1$ is either a — R$^2$COOH group or an alkyl radical and R$^2$ is an alkyl radical. These acids polymerize to form dimer acids of the general formula

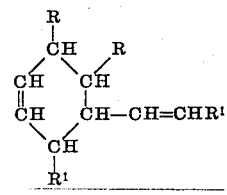

Other suitable dimer acids include those obtained from linoleic acid, linolenic acid, eleosteric acid, ricinoleic acid. Still another group of dimers are those obtained from dibasic acids such as 8,12-eicosadiene-1,20-dioic acid, 8-vinyl-10-octadecene-1,18-dioic acid, 7,11-octadecadiene-1,18-dioic acid, and the like. Dimer acids are available commercially sold under various trade names. A suitable such acid includes Empol 1014, a viscous aliphatic polybasic acid produced by the polymerization of unsaturated fatty acids at mid-molecule and containing 1% $C_{18}$ monobasic fatty acid, 95% $C_{36}$ dibasic fatty acid, and 4% $C_{54}$ tribasic fatty acid, acid value 188–193, soaponification value 195–198 and neutralization equivalent 292–298.

The polymerization may be effected by utilizing the lower aliphatic esters of the unsaturated acids so as to prevent decarboxylation during the heating period, and the converting the ester groups to carboxyl groups through hydrolysis. This process is illustrated in the Industrial and Engineering Chemistry, page 89, volume 33 (1941) and page 1139, volume 38 (1946).

According to a modified embodiment of the present invention a saturated normal aliphatic dicarboxylic acid is used instead of a dimer acid in preparing the condensation product. Preferred saturated acids include acids having six to ten carbon atoms in their molecule, such as adipic, suberic, azelaic and sebacic acids, although the higher molecular weight acids are also suitable.

The amount of the reactants employed in preparing the condensation product are critical. It is necessary to react the diepoxide blend with the dimer acids in a near equal molar ratio. It is also very advantageous to utilize triphenylphosphine as the catalyst.

At a mole ratio (chemical equivalent ratio) of diepoxide blend to dimer acid of 1 to 1, the highest molecular weight polymers are formed, but these condensates do not produce traffic paints exhibiting the most desirable properties. It has been found that the epoxy-terminated polymers (ratio of dimer acid to epoxy is less than 1.0) are more durable than the acid-terminated polymers (ratio of dimer acid to epoxy is greater than 1.0).

Suitable traffic paints can be prepared from polymers obtained when the chemical equivalent ratio of dimer acid to diepoxy blend is from about 0.70:1.0 to about 1.25:1.0. Optimum properties in traffic paint formulations are achieved when the dimer acid to epoxy ratio is from about 0.70:1.0 to about 0.90:1.0. An exceptionally good polymer is produced when the dimer acid epoxy ratio is 0.825:1.0.

It will be appreciated that although the epoxy-terminated polymers are more durable than the acid-terminated polymers, both polymers exhibit outstandingly improved properties over the conventional alkyd resins-based traffic paints.

It will be appreciated that since the dimer acids and the diepoxide blend are both essentially difunctional, the mole ratio is essentially the same as the chemical equivalent ratio of reactants. Therefore, in this specification, the terms "mole ratio" and "chemical equivalent ratio" are deemed to be interchangeable.

The triphenylphosphine catalyst is preferably used in amounts varying from about 0.05 to 3 percent by weight of reactants.

Temperatures employed in the reaction will generally vary from about 50°C to about 150°C. In most cases, the acidic component and the polyepoxide will be quite reactive and temperatures of the order of about 50°C to 125°C will be sufficient to effect the desired reaction. In other instances, it may be desirable to use higher temperatures, such as those from 125°C to 275°C. Temperatures of 300°C or over should generally not be employed.

The reaction is preferably conducted under atmospheric pressure, but it may be advantageous in some cases to employ substmospheric or super-atmospheric pressures.

The reaction may be conducted in the presence or absence of solvents or diluents. In most cases, the acidic component and polyepoxide will be liquid and the reaction may be easily effected without the addition of solvents or diluents. However, in some cases, whether either or both reactants are solids or viscous liquids it may be desirable to add diluents to assist in effecting the reaction, such as, for example, inert hydrocarbons as xylene, toluene, cyclohexane, and other materials as cyclohexanone, and the like.

If solvents are employed in the reaction and the formed condensate is to be used for coating compositions, the solvent may be removed by any suitable method such as vacuum distillation and the like. If the condensate is not to be utilized for some time after its formation, it may also be desirable to remove the catalyst used in the preparation. This may be accomplished by neutralization, stripping, or the like. Since it is generally difficult and expensive to remove the catalyst and further since its presence is not detrimental, it is the usual practice to leave the catalyst in the polymer.

The condensate component may be prepared, for example, by heating in a closed kettle under an atmosphere of nitrogen at a temperature ranging from 120° to 225°C, from 0.75 to 1.25 chemical equivalents of a dimer acid with 1.0 chemical equivalents of the blend of the glycidyl polyethers, with constant stirring. The resulting polymer may then be dissolved in a solvent such as toluene to form a solution of desired solids content, e.g., 60 percent solids.

THE SOLVENT COMPONENT

A suitable solvent component of the traffic paint compositions of the present invention includes ketones, such as acetone and methyl ethyl ketone, alcohols, glycol ethers, toluene, xylene, benzene, mineral spirits, naphthas and other aromatic petroleum distillates. The solvent component may consist of a mixture of two or more of the above compounds. The ratio of solvent to resin component may be varied widely depending upon the chosen method of applying the traffic paint to the highway surface, i.e., spraying brushing, rolling, etc. Spraying is the usual method of applying the traffic paint to the highway surface. The concentration in this instance is usually a volume ratio of about 50:50, but in some situations may vary from 70:30 to 30:70, solvent to condensation product.

PIGMENT COMPONENT

The third and final component of the paint compositions of the present invention is the pigment. The pigment component usually contains a mixture of pigments. Any of the standard pigments which are used in conventional traffic paints are suitable for use in the paint compositions of this invention. Such pigments include, for example: 100 percent titanium dioxide; 30 percent titanium dioxide — 70 percent calcium sulfate mixture; a mixture of calcium carbonate and magnesium carbonate; diatomaceous silicas, treated and untreated clays, calcium sulfate, zinc oxide, mica, magnesium silicate and titanium calcium among others. The concentration of the pigment in the paint compositions, expressed as % pigment volume concentration, varies from about 40% to about 70 percent and preferably from about 45 to 55 percent. The term "percent pigment volume concentration" has reference to that volume portion of the paint, excluding the solvent which is pigment, e.g., a composition comprising one-third resin, one-third solvent and one-third pigment by volume would have a percent pigment volume concentration of 50.

In terms of the total paint composition the concentration of the condensation product component may range from about 10 to 30 percent by volume, the concentration of the solvent components may range from about 40 to 80 percent by volume and the concentration of the pigment component may range from about 10 to 30 percent by volume, the sum of the three components totaling 100 percent.

The pigment is added to the solvent-resin composition known more commonly as vehicle and blended therewith to obtain a homogeneous paint composition. Any suitable means of blending may be employed. The resulting traffic paint composition is applied to the highway surface, for example by spraying. The solvent evaporates from the composition leaving a tough film on the surface which has excellent wear and weather resistances.

The traffic paint compositions of the present invention are one-package systems and may be applied to highway surfaces by techniques presently employed in applying conventional traffic paints.

The following examples are presented in order to illustrate the process of the invention. Unless otherwise specified, parts are given by weight.

EXAMPLE I

This example illustrates the reduced dirt pick-up properties of the instant traffic paints prepared from condensates of dimer acids and a blend of glycidyl polyethers of 2,2-bis(4-hydroxyphenyl)propane.

Nine hundred and forty grams of Polyether A and 1185 grams of Empol 1014 (a viscous, aliphatic polymeric acid produced by the polymerization of unsaturated fatty acids at mid-molecule and containing 1% $C_{18}$ monobasic fatty acid, 95% $C_{36}$ dibasic fatty acid and 14% $C_{54}$ tribasic fatty acid; acid number of 194–198, saponification number of 197–201 and a color (Gardner 1963 max) of 5) and 9 grams of triphenylphosphine (chemical equivalent ratio of Polyether A to Empol 1014 is 0.825:1.000) are charged into a 5-liter, 4-neck flask equipped with a stirrer, thermometer and inert gas sparge. The flask is heated to 350°F under a nitrogen atmosphere and allowed to exotherm. After the temperature had subsided to 350°F the temperature was held at 350°F for one-half hour. The linear polymer composed of alternating Polyether A and dimer acid blocks having a molecular weight of approximately 3,800 is dissolved in toluene to about 60 percent solids.

The resulting solution had the following properties:

| | |
|---|---|
| solids | 60% |
| viscosity | X–Y |
| acid no. | 0.7 |
| color (Gardner) | 5 |
| weight per gallon | 8.110 |

The above procedure was repeated wherein various amounts of the Polyether A was replaced with Polyether B.

Traffic paint compositions were then prepared from the above condensates according to the following procedure:

To a solution of each of the condensates (60 percent solids) in toluene were added during constant stirring an amount of pigment consisting of titanium dioxide, magnesium silicate, calcium carbonate and diatomaceous silica to produce a composition having a 50 percent pigment volume concentration. The stirring is continued for approximately 15 minutes to obtain a loose mix or premix. The premix was then processed further to obtain complete pigment dispersion within the condensation product-solvent (or vehicle) portion of the paint composition by milling on a three-roll mill. The resulting homogeneous paint compositions were applied to traffic surfaces on U.S. Highway No. 1 near Newark, N.J. The traffic markings were then evaluated for fastness of drying, resistance to dirt pick-up and for durability (film loss)

The tests employed to determine fastness of drying and durability are relatively simple. The first is merely a matter of determining the time in minutes it takes for the paint to dry sufficiently before the painted line can bear traffic, while the second involves determining the percentage of film lost in the wheel wear area of lines applied transverse to traffic.

The test used to determine the resistance to dirt pick-up, although dependent on the judgement of the individual performing the test and therefore not completely standardized, is the test which is generally employed throughout the traffic paint industry. The test essentially consists of painting on a paved highway standard size stripes about 3 inches wide running transverse to traffic from the center of the highway to the edge using an automatic striping machine. The various paints are applied at intervals of about two feet on the highway so that a duplicate of each paint type will be exposed to the same amount of exposure to vehicular traffic. The skilled person running the test then rates each strip on a scale from 0 to 10 for degree of dirt pick-up; 0 indicating complete coverage of the strip and 10 indicating no dirt covers the strip, with various degrees of pick-up between. Although there is no pictorial standard for each standard of the degrees, it is apparent to one skilled in the art to tell whether a particular paint exhibits improved dirt pick-up on a comparative basis, and a relatively accurate rating can be made using this test.

The comparative data are tabulated in Table 1.

Several State specification paints (alkyd resin-based) were also evaluated and the results are also tabulated in Table I.

It is clear from the data that the traffic paints formulated from the condensates of dimer acids and polyepoxide blend have exceptionally improved resistance to dirt pick-up over the conventional dimer acid/polyepoxide condensate-based paints. While the conventional alkydsbased traffic paints exhibit good resistance to dirt pick-up, their film durability is significantly poorer than the instant traffic paints.

volume of a pigment and from about 10 to 30 percent by volume of a none-drying condensation product prepared by reacting at a temperature of from about 50°C to about 275°C, (1) from 0.70 to 0.90 chemical

TABLE I.—TRAFFIC PAINT PERFORMANCE

| Polyether/dimer acid condensate [1] | | | | | Durability—film loss [4] | | |
|---|---|---|---|---|---|---|---|
| Polyether A | Polyether B | Empol 1014 | Dry,[2] minutes | Dirt [3] | 50 days | 168 days | 249 days |
| 1.00 | | 0.825 | 30 | 3 | 0 | 5-10 | 25 |
| 0.98 | 0.02 | 0.825 | 30 | 6 | 0 | 15 | 30 |
| 0.95 | 0.05 | 0.825 | 30 | 6 | 0 | 15 | 30 |
| 0.90 | 0.10 | 0.825 | 30 | 6 | 0 | 10-15 | 25 |
| State specification paints: | | | | | | | |
| Maryland | | | 30 | 8 | 0 | 35 | 60 |
| Pennsylvania | | | 15 | 8 | 2 | 50 | 70 |
| Michigan | | | 30 | 7 | 2-5 | 45 | 60 |
| New Jersey | | | 15 | 6 | 5 | 60 | 70 |

[1] Chemical equivalents.
[2] Dry: Time in minutes before painted line can bear traffic.
[3] Dirt—Degree of dirt pick-up: 10=none, 8=slight, 6=moderate, 4=severe, 2=very severe, 0=complete.
[4] Durability: Percentage of film lost in wheel wear area of lines applied transverse to traffic.

EXAMPLE II

The procedures of Example I were substantially repeated wherein various amounts of Polyether A and Polyether B are reacted with EMPOL 1016 (a viscous, aliphatic polymeric acid produced by the polymerization of unsaturated fatty acids at mid-molecule and containing 87% $C_{36}$ dibasic fatty acid and 13% $C_{54}$ tribasic fatty acid; acid number 190-198 saponification number of 194-200 and a color (Gardner 1936 max) of 7).

The paint formulations were applied to U.S. Route No. 1 near Newark, N.J.

The comparative results are tabulated in Table II.

TABLE II.—TRAFFIC PAINT PERFORMANCE

| Epoxy resin/dimer acid polymer composition, equivalents | | | | Durability—film loss [2] | | |
|---|---|---|---|---|---|---|
| Polyether A | Polyether B | Empol 1016 | Dry [1] | 63 days | 115 days | 182 days |
| 0.90 | 0.10 | 0.825 | 30 | Trace | 10 | 15-20 |
| 0.70 | 0.30 | 0.825 | 30 | Trace | 20 | 25-30 |
| 0.60 | 0.40 | 0.825 | 30 | Trace | 20 | 25-30 |
| 0.40 | 0.60 | 0.825 | 25 | Trace | 25 | 25-30 |
| 0.20 | 0.80 | 0.825 | 25 | Trace | 25 | 25-30 |
| | 1.00 | 0.825 | 15 | 5 | 25 | 25-30 |
| State specification paints: | | | | | | |
| Maryland | | | 30 | 10 | 25-30 | 50 |
| Pennsylvania | | | 15 | 10-15 | 50 | 60 |
| Michigan | | | 15 | 5-10 | 35 | 40 |
| New Jersey | | | 15 | 10 | 45 | 60 |

[1] Dry: Time in minutes before painted line can bear traffic.
[2] Durability: Percentage of film lost in wheel wear area of lines applied transverse to traffic.

I claim as my invention:

1. A traffic paint composition which exhibits improved drying properties and reduced dirt pickup comprising from about 40 to 80 percent by volume of an inert organic solvent, from about 10 to 30 percent by volume of a pigment and from about 10 to 30 percent by volume of a none-drying condensation product prepared by reacting at a temperature of from about 50°C to about 275°C, (1) from 0.70 to 0.90 chemical equivalent of a dimer of unsaturated fatty acids having at least 12 carbon atoms, and (2) 1.0 chemical equivalent of a blend of two separately prepared glycidyl polyethers, one consisting essentially of about 0.90 to 0.99 chemical equivalent of a liquid glycidyl polyether of 2,2-bis(4-hydroxyphenyl) propane having an average molecular weight of about 350 and an epoxide equivalent weight of from about 185 to 195 and the other consisting essentially of about 0.01 to 0.10 chemical equivalent of a solid glycidyl polyether of 2,2bis(4-hydroxyphenyl) propane having an average molecular weight of about 900 and an epoxide equivalent weight of from about 425 to about 550.

2. A composition as in claim 1 wherein the dimer acid comprises an acid or acids derived from acids of the general formula $R-CH=CH-CH=CH-R^1$ wherein R is the radical $-R^2COOH$, $R^1$ is selected from the group consisting of R and $R^2$, and $R^2$ is an alkyl group, said acid having from 12 to 20 carbon atoms.

3. A compositions as in claim 1 wherein the reaction is performed in the presence of from 0.05 to 3 percent by weight of the reactants of triphenylphosphine.

4. A composition as in claim 1 wherein the condensate is prepared by reacting from 0.80 to 0.85 chemical equivalents of the dimer acid with 1.0 chemical equivalents of the blend of the two separately prepared glycidyl polyethers, one consisting essentially of about 0.90 to 0.98 chemical equivalents of a liquid glycidyl polyether of 2,2-bis(4-hydroxyphenyl)propane having an average molecular weight of about 350 and an epoxide equivalent weight from about 185 to about 195 and the other consisting essentially of about 0.02 to 0.10 chemical equivalents of a solid glycidyl polyether of 2,2-bis(4-hydroxyphenyl)propane having an average molecular weight of about 900 and an epoxide equivalent weight of from about 425 to 550.

* * * * *